(12) United States Patent
Park et al.

(10) Patent No.: US 8,837,903 B2
(45) Date of Patent: Sep. 16, 2014

(54) METHOD AND APPARATUS FOR GENERATING MOVIE-IN-SHORT OF CONTENTS

(75) Inventors: Mi-hwa Park, Anyang-si (KR); Jin-seok Choi, Yongin-si (KR); Ju-hee Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1082 days.

(21) Appl. No.: 12/026,744

(22) Filed: Feb. 6, 2008

(65) Prior Publication Data

US 2009/0060471 A1 Mar. 5, 2009

(30) Foreign Application Priority Data

Aug. 31, 2007 (KR) ........................ 10-2007-0088306

(51) Int. Cl.
| | |
|---|---|
| *G06F 3/00* | (2006.01) |
| *H04N 5/77* | (2006.01) |
| *H04N 5/92* | (2006.01) |
| *H04N 5/93* | (2006.01) |
| *H04N 7/025* | (2006.01) |
| *G06F 17/30* | (2006.01) |
| *G11B 27/32* | (2006.01) |
| *G11B 27/034* | (2006.01) |

(52) U.S. Cl.
CPC ........ *G11B 27/034* (2013.01); *G06F 17/30843* (2013.01); *G11B 27/322* (2013.01); *G06F 17/30817* (2013.01)
USPC ........... 386/241; 386/223; 386/278; 715/704; 715/716; 715/720; 715/723

(58) Field of Classification Search
USPC ......................................................... 386/46
See application file for complete search history.

(56) References Cited

U.S. PATENT DOCUMENTS

| | | | | |
|---|---|---|---|---|
| 7,813,620 | B2 * | 10/2010 | Okamoto et al. | 386/241 |
| 2003/0195021 | A1 * | 10/2003 | Yamashita et al. | 463/1 |
| 2004/0249861 | A1 * | 12/2004 | Hoshino et al. | 707/104.1 |
| 2005/0125828 | A1 * | 6/2005 | Fujiwara et al. | 725/60 |
| 2006/0236338 | A1 * | 10/2006 | Shimoda | 725/37 |
| 2007/0050517 | A1 * | 3/2007 | Doi | 709/236 |
| 2008/0082688 | A1 * | 4/2008 | Yi et al. | 709/246 |
| 2008/0273862 | A1 * | 11/2008 | Okamoto et al. | 386/123 |
| 2010/0115025 | A1 * | 5/2010 | Maegawa et al. | 709/203 |

FOREIGN PATENT DOCUMENTS

| | | |
|---|---|---|
| JP | 2002-125199 A | 4/2002 |
| KR | 10-0319158 B1 | 12/2001 |
| WO | WO 2006041202 A2 * | 4/2006 |

OTHER PUBLICATIONS

Communication dated Aug. 28, 2013 by the Korean Intellectual Property Office in counterpart Korean Patent Application No. 10-2007-0088306.
Communication, dated for Apr. 1, 2014, issued by the Korean Intellectual Property Office in counterpart Korean Application No. 10-2007-0088306.

* cited by examiner

*Primary Examiner* — Fatoumata Traore
(74) *Attorney, Agent, or Firm* — Sughrue Mion, PLLC (57) ABSTRACT

Provided are a method and apparatus for generating a movie-in-short (MIS). The method includes extracting metadata, in which predetermined points of time of content are recorded, generating a list of at least one MIS by using storage addresses of the points of time or reproduction points of time, which are indicated by the extracted metadata, storing the list, and reproducing a summary by reproducing the content during a predetermined time based on a point of time indicated by at least one MIS of the stored list.

18 Claims, 7 Drawing Sheets

REPRODUCTION TIME RELATED TO CHAPTER INFORMATION ⬭ +
REPRODUCTION TIME RELATED TO A POINT OF TIME WHEN AN ACTOR APPEARS ⬭

METHOD AND APPARATUS FOR GENERATING MOVIE-IN-SHORT OF CONTENTS

CROSS-REFERENCE TO RELATED PATENT APPLICATION

This application claims the benefit of Korean Patent Application No. 10-2007-0088306, filed on Aug. 31, 2007, in the Korean Intellectual Property Office, the disclosure of which is incorporated herein in its entirety by reference.

BACKGROUND OF THE INVENTION

1. Field of the Invention

The present invention relates to a method and apparatus for reproducing a summary of a multimedia file, and more particularly, to a method and apparatus for generating a movie-in-short (MIS) of a multimedia file which does not include an MIS. In the present specification, an MIS denotes summary reproduction information of content formed by using scenes related to predetermined features included in contents.

2. Description of the Related Art

Packaged media, such as DVDs, not only store main contents of a movie or music, but also store production processes, information related to staff involved in producing the contents, or the like of the corresponding contents. Also, media, which perform a preview function of a movie, such as a trailer, are often widely provided.

A movie-in-short (MIS) performs a function of reproducing a summary of the contents, unlike the preview function of the trailer, where the preview is pre-manufactured. An apparatus for reproducing content cannot summarize the content according to a plot of the content using the current technology. Accordingly, in order to provide a function of reproducing a summary of the content, an MIS should be included while providing a multimedia file.

A conventional function of reproducing a summary can be performed when MIS metadata information exists and the apparatus reproduces the summary according to the MIS metadata information. Such a function is not a specialized function, but a standard function, and when the apparatus recognizes an MIS structure, the apparatus reproduces summary data by reproducing an MIS.

SUMMARY OF THE INVENTION

The present invention provides a method of performing a function of reproducing a summary by using content even when a movie-in-short (MIS) does not exist.

The present invention also provides a method, in which reproducing a summary of a portion of content is possible unlike with a conventional method of reproducing a summary of the entire content even when there is an MIS, and converting from normal reproduction to summary reproduction or from summary reproduction to normal reproduction is possible.

According to an aspect of the present invention, there is provided a method of generating a movie-in-short (MIS), including: extracting metadata, in which predetermined points of time of content are recorded; and generating a list of at least one MIS by using storage addresses of the points of time or reproduction points of time, which are indicated by the extracted metadata.

The method may further include storing the list.

The method may further include reproducing a summary by reproducing the content during a predetermined time based on a point of time indicated by at least one MIS of the stored list.

The method may further include preserving the stored list while the summary is being reproduced, and deleting the stored list when the reproducing of the summary is completed.

The method may further include recording the list in an MIS area of a header area when the reproducing of the summary is completed.

The extracting of the metadata may extract at least one metadata from among metadata, in which a starting point of time or an end point of time of at least one chapter forming the content is recorded, metadata, in which points of time when actors appear in the content are recorded, metadata, in which points of time when predetermined places appear in the content are recorded, and metadata, in which the list is recorded.

The reproducing of the summary may reproduce a summary about all or some of the list.

The reproducing of the summary may include reproducing normal content after stopping the reproducing of the summary when a normal reproduction command is received from a user while reproducing the summary.

The extracting of the metadata may include extracting metadata, in which predetermined points of time of the content are recorded, from a header area of a multimedia file that includes the content, and the method may further include recording the generated list as metadata about the MIS in the header area.

According to another aspect of the present invention, there is provided an apparatus for generating an MIS, including: a metadata extractor, which extracts metadata, in which predetermined points of time of content are recorded; and an MIS list generator, which generates a list of MISs by using storage addresses of each point of time or reproduction points of time indicated by the extracted metadata.

The apparatus may further include a storage unit, which stores the list.

The apparatus may further include a summary reproducer, which reproduces a summary by reproducing the content during a predetermined time based on a point of time indicated by at least one MIS of the stored list.

According to another aspect of the present invention, there is provided an information storage medium, in which a multimedia file is recorded, wherein the multimedia file includes: information about predetermined points of time of content, including at least one of a starting point of time or an end point of time of at least one chapter forming the content, points of time when actors appear in the content, points of time when predetermined places appear in the content, and an MIS list, extracted from metadata; and metadata, in which the MIS list is recorded, wherein the MIS list is generated by using storage addresses of each point of time or reproduction points of time indicated by the predetermined points of time of the content.

According to another aspect of the present invention, there is provided a computer readable recording medium having recorded thereon a program for executing the method of above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 1:
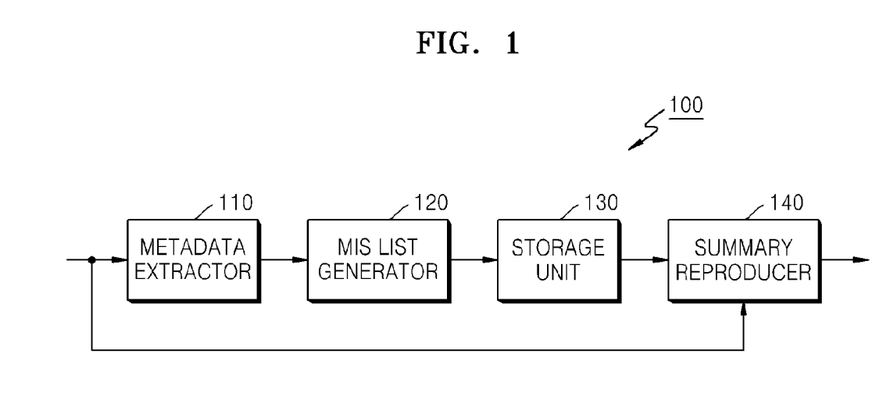
FIG. 1 is a block diagram illustrating an apparatus for generating a movie-in-short (MIS) according to an exemplary embodiment of the present invention.

FIG. 1 is a block diagram illustrating an apparatus 100 for generating a movie-in-short (MIS) according to an embodiment of the present invention.

The apparatus 100 includes a metadata extractor 110, an MIS list generator 120, a storage unit 130, and a summary reproducer 140.

The metadata extractor 110 extracts metadata, in which predetermined points of time of content are recorded, from an inputted multimedia file, and outputs the metadata to the MIS list generator 120.

The metadata extractor 110 extracts at least one piece of metadata from among metadata, in which a start point of time or an end point of time of at least one chapter forming content is recorded, metadata, in which a point of time that an actor appears is recorded, metadata, in which a point of time that a predetermined place appears is recorded, and metadata, in which a list of MISs is recorded.

Metadata about chapter information, actor information, an MIS, or the like can be based on important scenes selected by a producer or content providers. Also, the MIS may be generated and recorded as a viewer summarizes and reproduces the content.

The MIS list generator 120 generates a list of MISs by using storage addresses of points of time indicated by the metadata extracted by the metadata extractor 110 or reproduction points of time, and outputs the list to the storage unit 130.

The storage unit 130 stores the list of MISs received form the MIS list generator 120.

The storage unit 130 preserves the list while reproducing a summary and deletes the list when reproduction of the summary is completed. The storage unit 130 may be a buffer.

The summary reproducer 140 reproduces the summary by reproducing content for a predetermined time based on a point of time directed by at least one MIS of the list stored in the storage unit 130.

The summary reproducer 140 reproduces the summary about all or some of the list according to a selection made by the viewer.

Although not illustrated in FIG. 1, the summary reproducer 140 includes a reproduction converter (not shown), which stops reproducing the summary and reproduces normal content when a normal reproduction command is received from the user while reproducing the summary.

Also, although not illustrated in FIG. 1, the apparatus 100 includes an MIS list recorder (not shown), which records the list in an MIS area of a header area when reproduction of the summary is completed.

In addition, the apparatus 100 may further include an MIS list recorder, which records the list, which is generated as metadata about an MIS, in a header area.

Figure 2A:
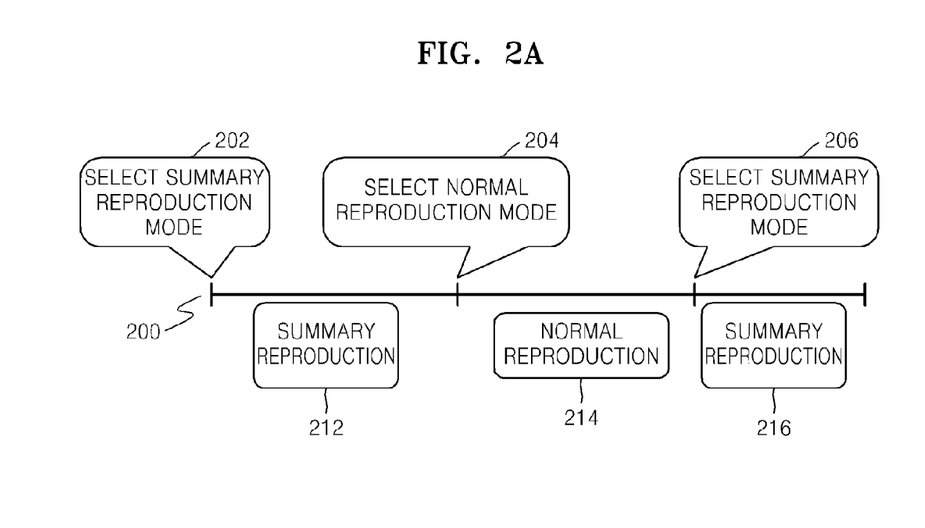
FIG. 2A is a diagram for describing a method of converting a summary reproduction mode and a normal reproduction mode according to an exemplary embodiment of the present invention.

FIG. 2A is a diagram for describing a method of converting a summary reproduction mode and a normal reproduction mode according to an embodiment of the present invention.

Functions of the summary reproducer 140 and the reproduction converter of the apparatus 100 will now be described with reference to FIG. 2A.

On a time axis 200, operation 202 indicates an event of selecting a summary reproduction mode. Similarly, operation 206 indicates an event of selecting a summary reproduction mode. Operation 204 indicates an event of selecting a normal reproduction mode.

Operations 212 and 216 are events of reproducing a summary of content, and operation 214 is an event of normally reproducing content.

When a summary reproduction mode is selected in operation 202, the summary of the content is reproduced in operation 212, and when a normal reproduction mode is selected in operation 204, the content is reproduced in operation 214. When a summary reproduction mode is selected again in operation 206 while the content is being reproduced in operation 214 in a normal reproduction mode, the summary of the content is reproduced in operation 216.

A user determines a normal reproduction mode or a summary reproduction mode of the content. Also, the user can command conversion of a reproduction mode by using a remote control. Accordingly, the user can view the content in a normal reproduction mode while viewing the content in a summary reproduction mode after converting the summary reproduction mode to the normal reproduction mode at a desired point of time. Also, when the user desires to view the summary while viewing the content in the normal reproduction mode, the user can convert the reproduction mode to the summary reproduction mode by using the remote control.

Figure 2B:
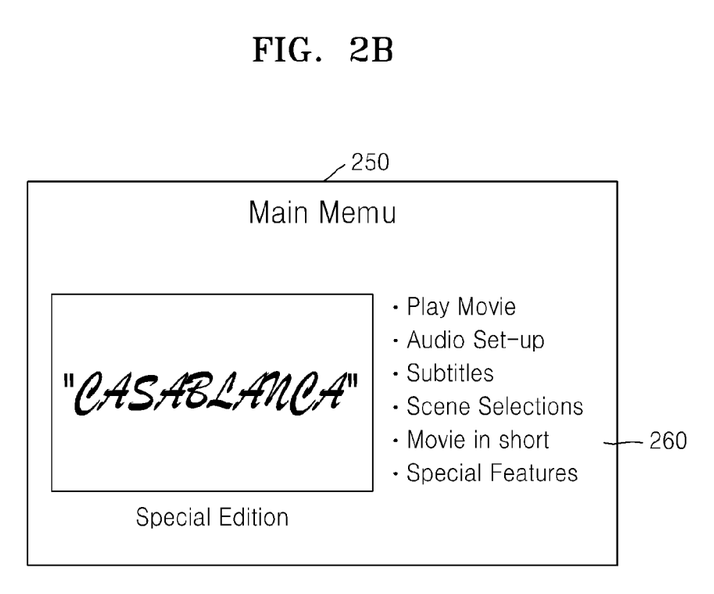
FIG. 2B is a diagram illustrating a menu screen, in which a reproduction mode can be selected, according to an exemplary embodiment of the present invention.

FIG. 2B is a diagram illustrating a menu screen, in which a reproduction mode can be selected, according to an embodiment of the present invention.

Reference numeral 250 denotes a main menu for selecting a reproduction setup, and reference numeral 260 denotes an item for selecting a summary reproduction mode.

In the current embodiment, a user accesses the main menu 250 in order to convert a reproduction mode while reproducing content or to determine a reproduction mode before starting to reproduce the content.

Figure 3:
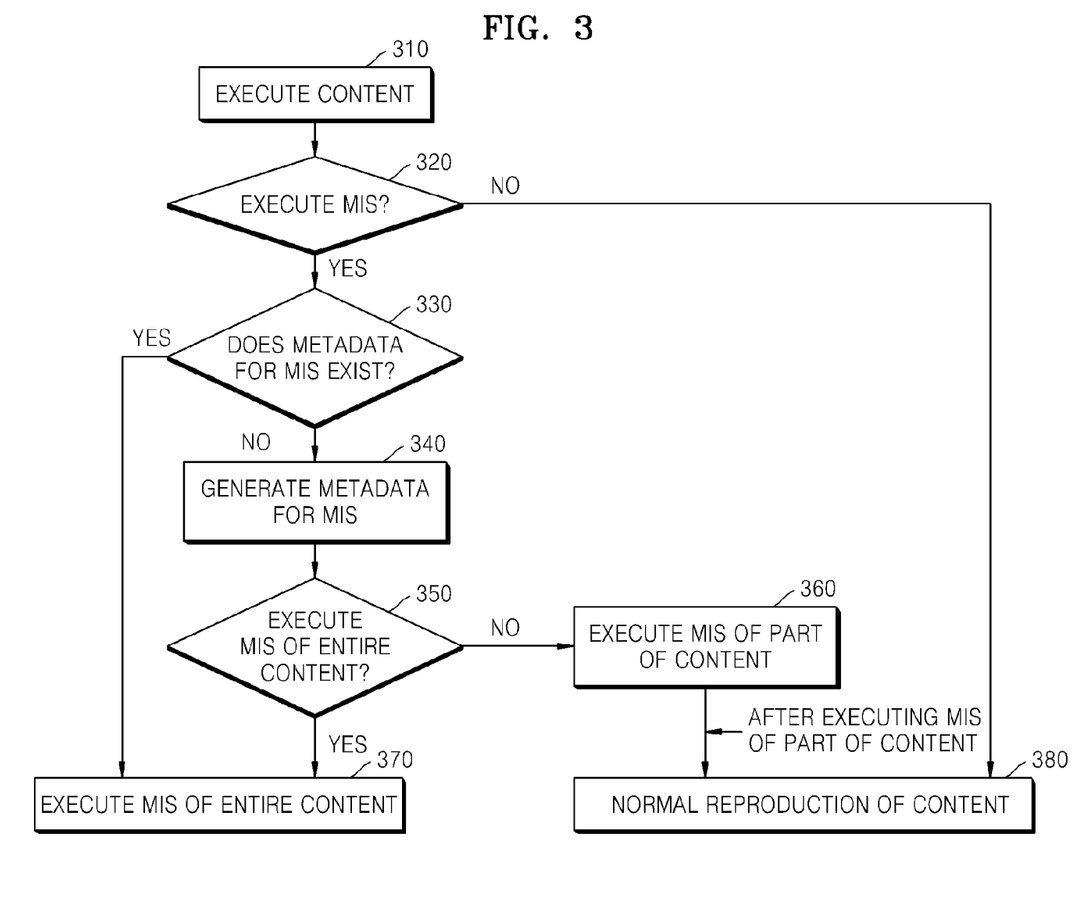
FIG. 3 is a flowchart illustrating a method of reproducing a summary according to an exemplary embodiment of the present invention.

FIG. 3 is a flowchart illustrating a method of reproducing a summary according to an embodiment of the present invention.

A method of executing a summary reproduction mode or a normal reproduction mode of content by generating an MIS will now be described with reference to FIG. 3.

In operation 310, content is executed.

In operation 320, it is determined whether the MIS is to be executed. If the MIS is not selected, operation 380 is performed, and if the MIS is selected, operation 330 is performed.

In operation 330, it is determined whether metadata for the MIS exists. If the metadata exists, operation 370 is performed, and if not, operation 340 is performed.

In operation 340, since the metadata does not exist, the metadata is generated.

In operation 350, it is determined whether the MIS of the entire content is to be executed. If the MIS of the entire content is to be executed, operation 370 is performed, and if not, operation 360 is performed.

In operation 360, the MIS of a part of the content is executed. After the MIS of the part of the content is executed, operation 380 is performed.

In operation 370, the MIS of the entire content is executed.

In operation 380, the content is reproduced in a normal reproduction mode.

Metadata for generating an MIS will now be described with reference to FIGS. 4 through 6.

Functions of the metadata extractor 110 and the summary reproducer 140 of FIG. 1 will be described in detail with reference to FIGS. 4 through 6.

Figure 4:
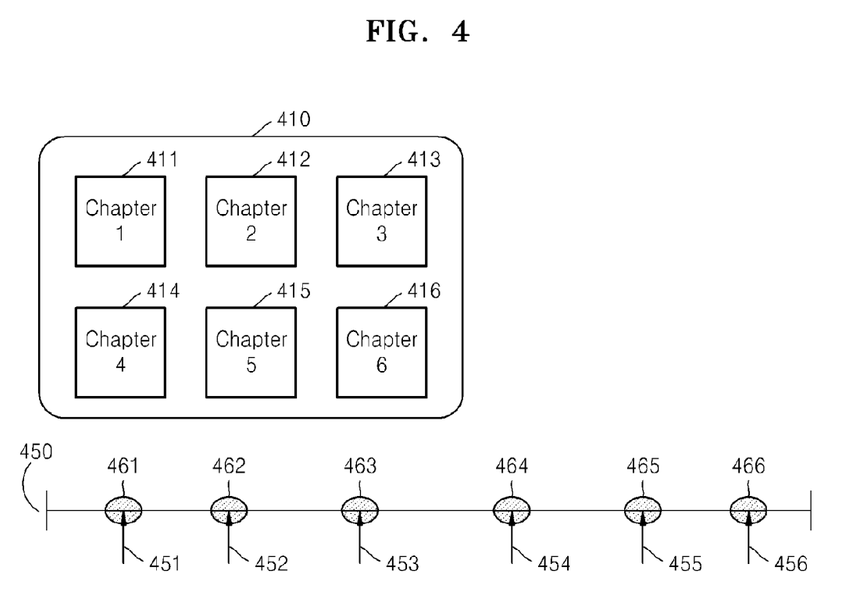
FIG. 4 is a diagram for describing a method of generating an MIS by using a chapter classification time according to an exemplary embodiment of the present invention.

FIG. 4 is a diagram for describing a method of generating an MIS by using a chapter classification time according to an embodiment of the present invention.

Metadata 410 shows chapter metadata information about content formed of chapters.

Chapters 411 through 416 respectively denote chapters 1 through 6.

Points of time 451 through 456 each denote points of time that chapters 411 through 416 start or end.

The points of time 451 through 456 on a time axis 450 illustrate points of time that content is selected and reproduced.

A summary reproduction mode of the content is executed by reproducing one of predetermined times 461 through 466 based on boundary times between each of the chapters 451 through 456. Accordingly, the metadata extractor 110 extracts a starting point of time or an ending point of time from the metadata 410, in which the points of time 451 through 456 are recorded, and the MIS list generator 120 includes addresses or points of time indicating the points of time 451 through 456 in the MIS list.

Information about at least one chapter can be selected or information about a part of a chapter can be selected.

The summary reproducer 140 receives the points of time 451 through 456 from a list of MIS and then reproduces the predetermined times 461 through 466 based on the points of time 451 through 456. The content may be reproduced for several minutes before a reference point of time, after the reference point of time, or during the reference point of time.

Figure 5:
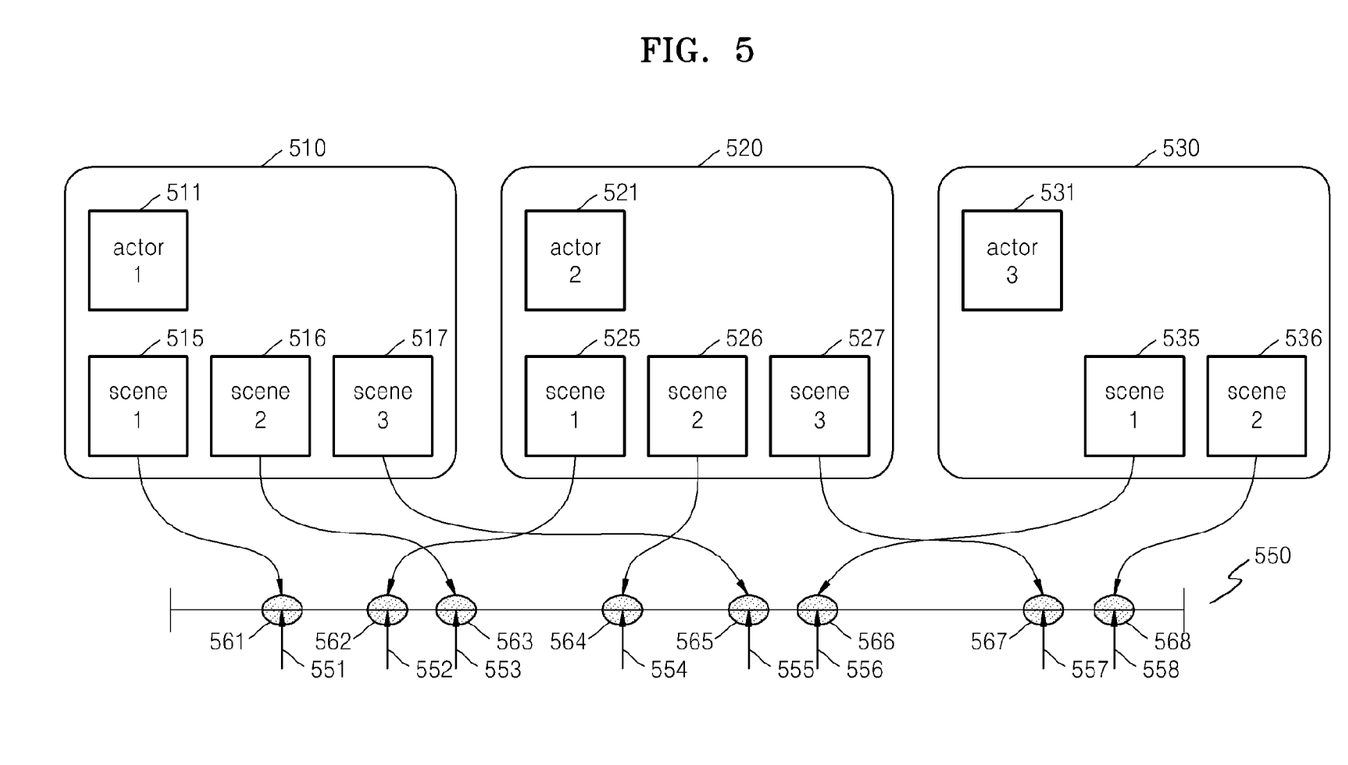
FIG. 5 is a diagram illustrating a method of generating an MIS by using actor appearance information according to an exemplary embodiment of the present invention.

FIG. 5 is a diagram illustrating a method of generating an MIS by using actor appearance information according to an embodiment of the present invention.

Data 510 is information about metadata, in which information about an actor 1 is recorded. Similarly, data 520 and 530 respectively are information about metadata, in which information about an actor 2 and an actor 3 are recorded.

Data 511 is information about the actor 1, and data 515, 516, and 517 are respectively scene information about scenes 1, 2, and 3 in which the actor 1 appears.

Similarly, data 521, and 525 through 527 are respectively information about the actor 2, and scene information about scenes 1, 2, and 3 in which the actor 2 appears.

Data 531 and 535 through 536 are respectively information about the actor 3, and scene information about scenes 1 and 2 in which the actor 3 appears.

Points of time 551 through 558 show scene points of time indicated by each piece of scene information.

Each reproduction point of time 561 through 568 on a time axis 550 shows a point of time that content is selected and reproduced.

The MIS is generated by using metadata in which information about actors appearing in the content is recorded. In other words, the metadata extractor 110 extracts information about actors from the metadata, and the MIS list generator 120 generates a list by using address information or time information of the points of time 551 through 558 of the scenes in which a corresponding actor appears (data 515 through 517, 525 through 527, and 535 through 536).

In other words, a list about the actor 1 includes the points of time 551, 553, and 555 relating to information about scenes 1, 2, and 3 (data 515, 516, and 517).

A plurality of scene points of time may be included in information about an actor, and thus all scene points of time may be selected by a user, or a part of the scene point of time desired by the user may be selected. Similarly, information about an actor may be selectively determined.

The summary reproducer 140 reproduces the predetermined reproduction points of time 561 through 568 based on the scene points of time in which selected actors appear (points of time 551 through 558). Like a case of using chapter information, the data 515 through 517, 525 through 527, and 535 through 536 are reproduced for several minutes based on before, after, or during each scene point of time (the points of time 551 through 558).

In other words, for example, in the case of the actor 1, when the summary reproducer 140 reproduces any one of the information about the scenes 1, 2, and 3 (the data 515, 516, and 517), the corresponding reproducing point of time 561 through 568 is reproduced based on each scene point of time.

Figure 6:
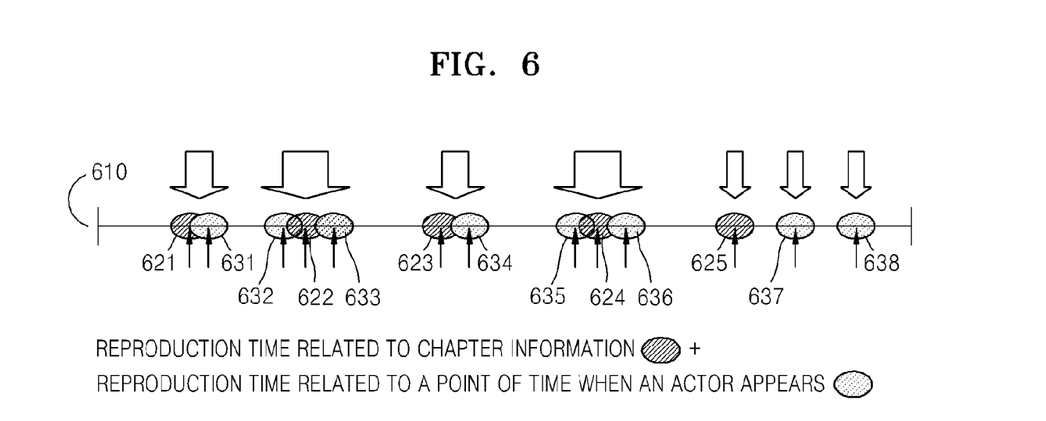
FIG. 6 is a diagram illustrating a method of generating an MIS by using both chapter classification time and actor appearance information according to an exemplary embodiment of the present invention.

FIG. 6 is a diagram illustrating a method of generating an MIS by using both chapter classification time and actor appearance information according to an embodiment of the present invention.

Reproduction points of time 621 through 625 on a time axis 610 shows reproducing times using chapter information.

Reproduction points of time 631 through 638 on the time axis 610 shows reproducing times using actor information.

According to the current embodiment, the MIS is generated using at least two pieces of metadata information. According to FIG. 6, a method of reproducing a summary reproduces a summary of content by using both chapter information and the actor information. Accordingly, a summary reproduction mode of the content is executed by selectively viewing the reproduction points of time 621 through 625, which are based on starting or ending points of time of chapters, and the reproduction points of time 631 through 638, which are based on points of time when an actor appears.

Thus, a viewer can view the content in the summary reproduction mode according to the chapter information and the actor information. According to the current embodiment, the chapter and actor information is extracted from various pieces of metadata, which can be a basis for reproducing a summary. For example, the chapter information and actor information of FIGS. 4 through 6 can be used, and alternatively, a summary can be reproduced based on places that appear in the content.

Figure 7:
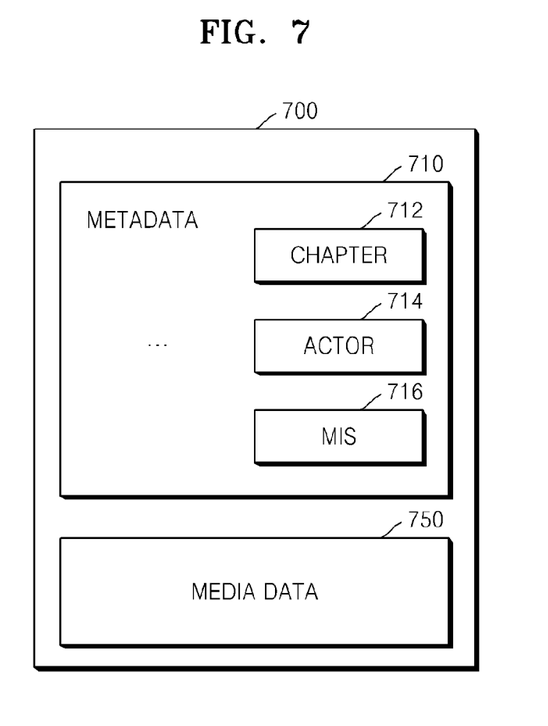
FIG. 7 is a diagram illustrating a structure of a multimedia file format including metadata generated according to an exemplary embodiment of the present invention.

FIG. 7 is a diagram illustrating a structure of a multimedia file format including metadata generated according to an embodiment of the present invention.

Functions of the metadata extractor 110 and the MIS list recorder will now be described in detail with reference to FIG. 7.

A format 700 denotes a multimedia file format, in which an MIS list is recorded.

The format 700 records metadata 710, in which information about content is recorded, and media data 750, in which the content is recorded. The format 700 may be packaged media, such as a DVD.

The metadata 710 includes chapter information 712, actor information 714, and MIS information 716.

The storage unit 130 deletes the MIS list when reproduction of a summary is completed. Alternatively, the MIS list recorder records the MIS list in an MIS area of a header area when reproduction of a summary is completed.

Alternatively, MIS metadata may be generated in the header area, and the MIS list can be recorded in the MIS metadata.

While reproducing a summary, the metadata extractor 110 can extract the MIS list from not only metadata, in which information based on the details or structure of content is recorded, such as in the cases of FIGS. 4 through 6, but also from metadata, in which an MIS list that is pre-generated by reproducing a summary is recorded. Accordingly, an MIS can be reproduced according to the previously recorded MIS list.

Figure 8:
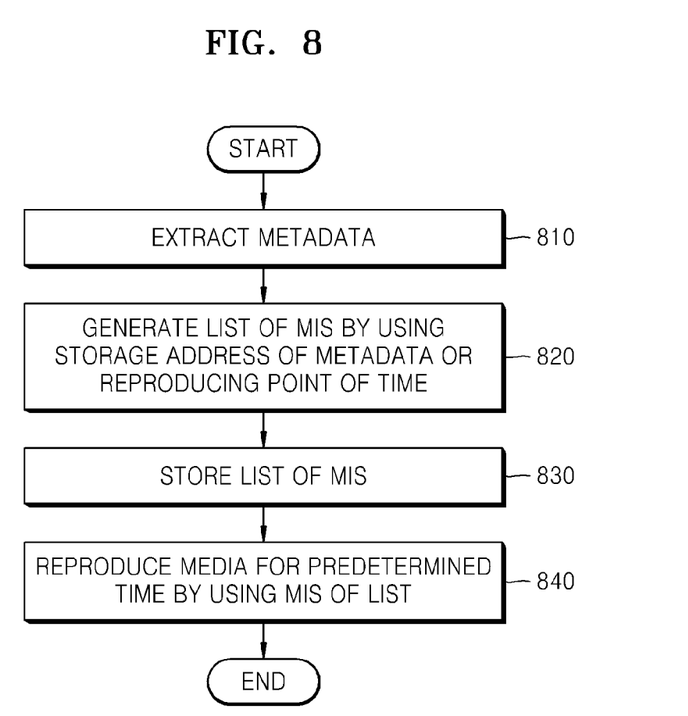
FIG. 8 is a flowchart illustrating a method of generating an MIS according to an exemplary embodiment of the present invention.

FIG. 8 is a flowchart illustrating a method of generating an MIS according to an embodiment of the present invention.

In operation 810, metadata, in which predetermined points of time of content are recorded, is extracted.

In operation 820, a list of MISs is generated by using storage addresses of points of time indicated by the extracted metadata, or by the reproduction points of time.

In operation 830, the list is stored.

In operation 840, the MIS is reproduced by reproducing the content for a predetermined time based on a point of time indicated by at least one MIS of the stored list.

The embodiments of the present invention can be written as computer programs and can be implemented in general-use digital computers that execute the programs using a computer readable recording medium or other types of media. Examples of the computer readable recording medium include magnetic storage media (e.g., ROM, floppy disks, hard disks, etc.) and optical recording media (e.g., CD-ROMs, or DVDs). Other types of media include storage media such as carrier waves (e.g., transmission through the Internet).

The method and apparatus for generating an MIS according to an aspect of the present invention can generate an MIS by using metadata information, such as chapter information, actor information, or existing MIS, even if the MIS does not exist. Accordingly, a function of reproducing a summary including details desired by a user can be performed. Also, metadata information, such as the chapter information and the actor information, as well as place information, which can be a basis for reproducing a summary, can be combined in various ways.

Unlike a conventional method, which reproduces a summary of the entire contents even if an MIS exists, the method according to an aspect of the present invention can reproduce a summary of a part of the content. Accordingly, a desired time or quantity of the summary can be reproduced.

Also, a normal reproduction mode can be converted to a summary reproduction mode, and visa versa, while the user views the content.

In addition, an information storage medium wherein metadata, in which MIS information generated by using information about points of time extracted from metadata is recorded, can be newly recorded or updated.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of generating a movie-in-short (MIS), comprising:
    extracting metadata, in which predetermined points of time of content are recorded, from an inputted multimedia file which does not include the MIS;
    generating a list of at least one MIS by using storage addresses of the points of time or reproduction points of time, which are indicated by the extracted metadata; and
    storing, by a storage unit which is a hardware component, the list; and
    reproducing a summary of the content by selecting partial contents, in the content, corresponding to the reproduction points of time in the generated list of MIS and reproducing the selected partial contents;
    wherein the extracting of the metadata comprises extracting metadata, in which predetermined points of time of the content are recorded, from a header area of a multimedia file that includes the content.

2. The method of claim 1, wherein the reproducing the summary comprises reproducing the content during a predetermined time based on a point of time indicated by at least one MIS of the stored list.

3. The method of claim 2, further comprising preserving the stored list while the summary is being reproduced, and deleting the stored list when the reproducing of the summary is completed.

4. The method of claim 2, further comprising recording the list in an MIS area of a header area when the reproducing of the summary is completed.

5. The method of claim 2, wherein the reproducing of the summary reproduces a summary about all or some of the list.

6. The method of claim 2, wherein the reproducing of the summary comprises reproducing normal content after stopping the reproducing of the summary when a normal reproduction command is received from a user while reproducing the summary.

7. The method of claim 1, wherein the extracting of the metadata extracts at least one metadata from among metadata, in which a starting point of time or an end point of time of at least one chapter forming the content is recorded, metadata, in which points of time when actors appear in the content are recorded, metadata, in which points of time when predetermined places appear in the content are recorded, and metadata, in which the list is recorded.

8. The method of claim 1,
    further comprises recording the generated list as metadata about the MIS in the header area.

9. An apparatus for generating a movie-in-short (MIS), comprising:
    a metadata extractor, which extracts metadata, in which predetermined points of time of content are recorded, from an inputted multimedia file which does not include the MIS;
    an MIS list generator, which generates a list of MISs by using storage addresses of each point of time or reproduction points of time indicated by the extracted metadata; and
    a non-transitory storage unit, which stores the list; and a summary reproducer, which selects partial contents, in the content, corresponding to the reproduction points of time in the generated list of MIS and reproduces the selected partial contents;

wherein the metadata extractor extracts metadata, in which predetermined points of time of the content are recorded, from a header area of a multimedia file that includes the content.

10. The apparatus of claim 9, wherein the summary reproducer reproduces the content during a predetermined time based on a point of time indicated by at least one MIS of the stored list.

11. The apparatus of claim 10, wherein the storage unit preserves the stored list while the summary is being reproduced, and deletes the stored list when the reproducing of the summary is completed.

12. The apparatus of claim 10, further comprising an MIS list recorder, which records the list in an MIS area of a header area when the reproducing of the summary is completed.

13. The apparatus of claim 10, wherein the summary reproducer reproduces a summary about all or some of the list.

14. The apparatus of claim 10, wherein the summary reproducer comprises a reproduction converter, which reproduces normal content after stopping the reproducing of the summary when a normal reproduction command is received from a user while reproducing the summary.

15. The apparatus of claim 9, wherein the metadata extractor extracts at least one metadata from among metadata, in which a starting point of time or an end point of time of at least one chapter forming the content is recorded, metadata, in which points of time when actors appear in the content are recorded, metadata, in which points of time when predetermined places appear in the content are recorded, and metadata, in which the list is recorded.

16. The apparatus of claim 9,
further comprises an MIS list recorder, which records the generated list as metadata about the MIS in the header area.

17. A non-transitory information storage medium, in which a multimedia file is recorded, wherein the multimedia file comprises:

information about predetermined points of time of content, including at least one of a starting point of time or an end point of time of at least one chapter forming the content, points of time when actors appear in the content, points of time when predetermined places appear in the content, and a Movie-In-Short (MIS) list, extracted from metadata; and metadata, in which the MIS list is recorded, wherein the MIS list is generated by using storage addresses of each point of time or reproduction points of time indicated by the predetermined points of time of the content;

wherein the metadata, in which predetermined points of time of the content are recorded, is extracted from a header area of the multimedia file that includes the content.

18. A non-transitory computer readable recording medium having recorded thereon a program for executing a series of operations for generating a movie-in-short (MIS), the series of operations comprising:

extracting metadata, in which predetermined points of time of content are recorded, from an inputted multimedia file which does not include the MIS;

generating a list of at least one MIS by using storage addresses of the points of time or reproduction points of time, which are indicated by the extracted metadata; and storing, by a storage unit which is a hardware component, the list; and reproducing a summary of the content by selecting partial contents, in the content, corresponding to the reproduction points of time in the generated list of MIS and reproducing the selected partial contents;

wherein the extracting of the metadata comprises extracting metadata, in which predetermined points of time of the content are recorded, from a header area of a multimedia file that includes the content.

* * * * *